US010325018B2

(12) United States Patent
Calvo et al.

(10) Patent No.: US 10,325,018 B2
(45) Date of Patent: Jun. 18, 2019

(54) TECHNIQUES FOR SCHEDULING LANGUAGE MODELS AND CHARACTER RECOGNITION MODELS FOR HANDWRITING INPUTS

(71) Applicant: Google LLC, Mountain View, CA (US)

(72) Inventors: Marcos Calvo, Zürich (CH); Victor Carbune, Basel (CH); Henry Rowley, Sunnyvale, CA (US); Thomas Deselaers, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/295,192

(22) Filed: Oct. 17, 2016

(65) Prior Publication Data

US 2018/0107650 A1    Apr. 19, 2018

(51) Int. Cl.
| | | |
|---|---|---|
| G06F 21/00 | (2013.01) | |
| G06F 17/27 | (2006.01) | |
| G06F 3/0482 | (2013.01) | |
| G06F 3/0488 | (2013.01) | |
| G06K 9/00 | (2006.01) | |

(52) U.S. Cl.
CPC ........ *G06F 17/2765* (2013.01); *G06F 3/0482* (2013.01); *G06F 3/04883* (2013.01); *G06F 17/275* (2013.01); *G06K 9/00402* (2013.01)

(58) Field of Classification Search
CPC ................................................. G06F 3/04883
USPC ...................................................... 704/270.1
See application file for complete search history.

(56) References Cited

U.S. PATENT DOCUMENTS

| | | |
|---|---|---|
| 9,002,699 B2 | 4/2015 | Qin |
| 2008/0046839 A1 | 2/2008 | Mehra et al. |
| 2009/0295737 A1 | 12/2009 | Goldsmith et al. |
| 2011/0115707 A1 | 5/2011 | Zhang et al. |

(Continued)

FOREIGN PATENT DOCUMENTS

| | | |
|---|---|---|
| WO | WO 2014/200736 | 12/2014 |
| WO | WO 2015/087084 | 6/2015 |

OTHER PUBLICATIONS

Khan, O. et al., "Hypotheses Ranking and State Tracking for a Multi-Domain Dialog System using Multiple ASR Alternates," Proceedings of the 16th Annual Conference of the International Speech Communication Association (Interspeech 2015), pp. 1-5.

(Continued)

*Primary Examiner* — Jakieda R Jackson
(74) *Attorney, Agent, or Firm* — Dority & Manning, P.A.

(57) ABSTRACT

A first handwriting input is received comprising strokes corresponding to a set of first characters comprising one or more first characters forming a first language model unit. A set of candidate first characters and a set of candidate first language model units with corresponding probability scores are determined based on an analysis of the one or more sets of candidate first characters using the first language model and a corresponding first character recognition model. When no first probability score satisfies a threshold, one or more sets of candidate second characters and a set of candidate second language model units are determined based on an analysis of the first handwriting input using a second language model and a corresponding second character recognition model. A first candidate list is then output comprising at least one of the set of candidate second language model units.

20 Claims, 3 Drawing Sheets

(56) References Cited

U.S. PATENT DOCUMENTS

2012/0223889 A1    9/2012  Medlock et al.
2014/0363074 A1*  12/2014  Dolfing .............. G06K 9/00979
                                                          382/156
2015/0269432 A1    9/2015  Motoi

OTHER PUBLICATIONS

Planells, J. et al., "A Multi-domain Dialog System to integrate heterogeneous Spoken Dialog Systems," Interspeech 2013, Aug. 25-29, 2013, Lyon, France, pp. 1891-1895.
International Search Report for PCT/US2017/052662 dated Dec. 14, 2017, 13 pages.

* cited by examiner

TECHNIQUES FOR SCHEDULING LANGUAGE MODELS AND CHARACTER RECOGNITION MODELS FOR HANDWRITING INPUTS

FIELD

The present disclosure generally relates to handwriting recognition and, more particularly, to techniques for scheduling language models and character recognition models for handwriting inputs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some languages include a large number of characters, and thus conventional computing device keyboards may be impractical for inputting characters in these languages. One example of such a language is Chinese, which includes thousands of characters. A conventional keyboard may be impractical for Chinese, for example, because it may be time consuming for the user to cycle through a number of pages of possible characters in order to identify each desired character. A touch computing device (e.g., a mobile phone), however, may also be configured to receive a handwriting input. This handwriting input can include one or more strokes via a touchpad or touchscreen of the touch computing device (using a stylus, using a finger, etc.). Using handwriting inputs can enable users to quickly input characters, which can be particularly useful for languages that have large quantities of characters.

SUMMARY

According to one aspect of the present disclosure, a computer-implemented technique is presented. According to other aspects of the present disclosure, a computer-readable medium having a set of instructions stored thereon and a client computing device comprising the computer-readable medium are presented. The computer-readable medium can have a set of instructions stored thereon that, when executed by one or more processors of the client computing device, cause the client computing device to perform the technique.

In one exemplary implementation, the technique can comprise: receiving, via a touch display of a client computing device, a first handwriting input comprising one or more first strokes corresponding to a set of first characters, the set of first characters comprising one or more first characters forming a first language model unit; determining, by the client computing device, a set of candidate first characters for each first character of the set of first characters based on an analysis of the first handwriting input using a first language model and a corresponding first character recognition model; determining, by the client computing device, a set of candidate first language model units based on an analysis of the one or more sets of candidate first characters using the first language model, each candidate first language model unit having a corresponding first probability score; when no first probability score satisfies a threshold, determining, by the client computing device, one or more sets of candidate second characters and a set of candidate second language model units based on an analysis of the first handwriting input using a second language model and a corresponding second character recognition model; and outputting, by the client computing device, a first candidate list comprising at least one of the set of candidate second language model units.

In some implementations, the technique further comprises: receiving, by the client computing device, a user selection of one of the second candidate second language model units from the first candidate list to obtain a selected second language model unit; and in response to receiving the user selection, displaying, by the touch display, the selected second language model unit in a text entry area of an application.

In some implementations, the technique further comprises when a particular first probability scores satisfies the threshold, outputting, by the client computing device, the candidate first language model unit corresponding to the particular first probability score.

In some implementations, the use of the first language model and the corresponding first character recognition model does not overlap temporally with the use of the second language model and the corresponding second character recognition model.

In some implementations, the first and second language models correspond to different natural language models. In other implementations, the first language model corresponds to one of a natural language model and an emoji model, and the second language model corresponds to the other of the natural language model and the emoji model.

In some implementations, the technique further comprises: after outputting the first candidate list, receiving, via the touch display, a second handwriting input; determining, by the client computing device, one or more sets of candidate third characters and a set of candidate third language model units based on an analysis of the second handwriting input using the second language model and the corresponding second character recognition model, wherein each third language model unit has a corresponding third probability score; when one of the third probability scores satisfies the threshold, outputting, by the client computing device, a second candidate list comprising at least one of the candidate third language model units; and when no third probability score satisfies the threshold, determining, by the client computing device, one or more sets of fourth candidate characters and a set of candidate fourth language model units based on an analysis of the second handwriting input using the first language model and the corresponding first character recognition model.

In some implementations, the first and second character recognition models are the same and are associated with a particular script, and the first and second language models are different and correspond to different natural languages that are both associated with the particular script.

In some implementations, the technique further comprises receiving, by the client computing device, a user input specifying the first language model and the first character recognition model as default models.

In some implementations, each candidate first and second language model unit is a word.

In some implementations, the first and second language models each utilize n-grams, where an (n−1) gram represents a previously accepted candidate language model unit that is indicative of a context of the first handwriting input, and determining the first and second probability scores is based on the context.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, handwriting inputs can enable users to quickly input characters in languages having large quantities of characters (e.g., Chinese). Some languages, such as Malayalam, Lao, and Khmer, do not have standardized keyboards. Handwriting inputs can also be used to input non-traditional characters, such as characters that are not part of any words of any natural languages. Non-limiting examples of such characters include emojis, shapes, and mathematical expressions. The term "emoji" as used herein refers to digital images that correspond to strings of characters. To input an emoji, a user typically enters a specific string of characters, which is then converted to the corresponding digital image. For example, a semicolon ";" followed by a closed parenthesis ")" could be provided via a handwriting input and then converted to a winking smiley face. Alternatively, for example, a triangle shape could be provided via a handwriting input and then converted to the delta character "Δ."

The handwriting recognition process generally involves two parts: character recognition and language model unit (e.g., word) recognition. In conventional systems, the process involves receiving a handwriting input, determining most-likely characters for the handwriting input using a character recognition model and (e.g., once all the characters have been recognized) using a language model to determine most likely language model unit(s). The term "language model unit" as used herein refers to a unit that is output by a language model. Examples of language model units include lexical units, such as words, phrases, and sentences. For purposes of this disclosure, a multi-character unit, such as an emoji, a mathematical expression, or a shape, can be described as being a word and thus an emoji, a mathematical expression, and a shape can each represent a language model unit. For these conventional systems, however, when an improper character recognition model is being used, the characters that are fed into the language model will be inaccurate, which will result in an inaccurate language model unit. One way to overcome this problem is to run two or more pairs of language models and their corresponding character recognition models on the handwriting input simultaneously, but this is computationally expensive.

Accordingly, techniques are presented for improved scheduling of language models and character recognition models for handwriting inputs. These techniques are configured such that only one pair of a language model and a corresponding character recognition model are operating at a given time, which saves computational resources. A language model and a corresponding character recognition model are initially selected (e.g., corresponding to a natural language, per default settings). A handwriting input is received that comprises one or more strokes indicative of a set of characters forming a language model unit (e.g., an emoji). Sets of candidate characters are determined for each character of the handwriting input using the selected language model and its corresponding character recognition model. These sets of candidate characters are then fed into the selected language model to determine a set of candidate language model units having corresponding probability scores. When no scores satisfy a threshold, the language model and its corresponding character recognition model can be changed (e.g., to the models corresponding to emojis).

Figure 1:
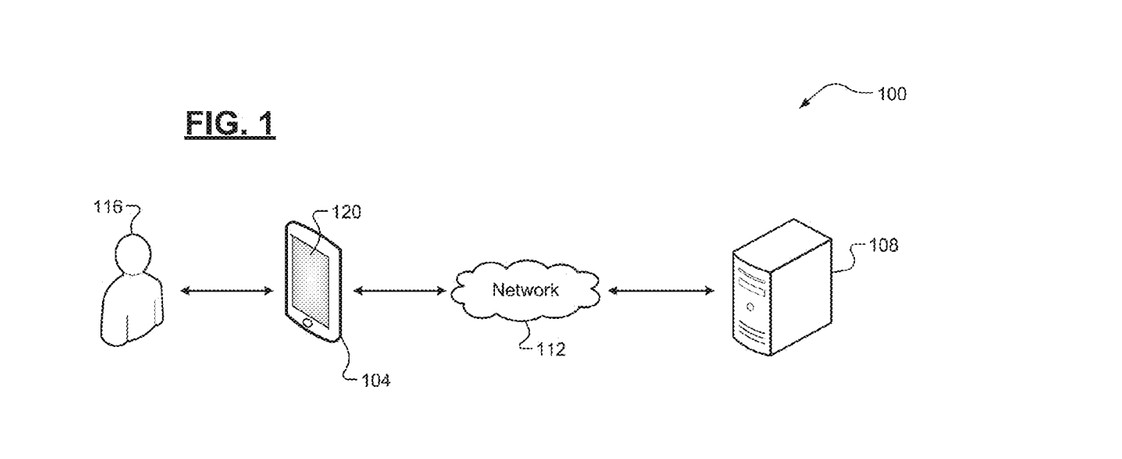
FIG. 1 is a diagram of an example computing system according to some implementations of the present disclosure.

Referring now to FIG. 1, an example computing system 100 according to some implementations of the present disclosure is illustrated. The computing system 100 can include a client computing device 104 that can communicate with a server computing device 108 via a network 112. The network 112 can be a local area network (LAN), a wide area network (WAN), e.g., the Internet, or a combination thereof. While the client computing device 104 is shown to be a mobile phone, it will be appreciated that the client computing device 104 can be any suitable mobile computing device (a tablet computer, a laptop computer, etc.). The server computing device 108 can be any suitable hardware server or plurality of hardware servers operating in a parallel or distributed architecture. A user 116 can operate the client computing device 104, such as by providing handwriting inputs via a touchpad or touch display 120.

Figure 2:
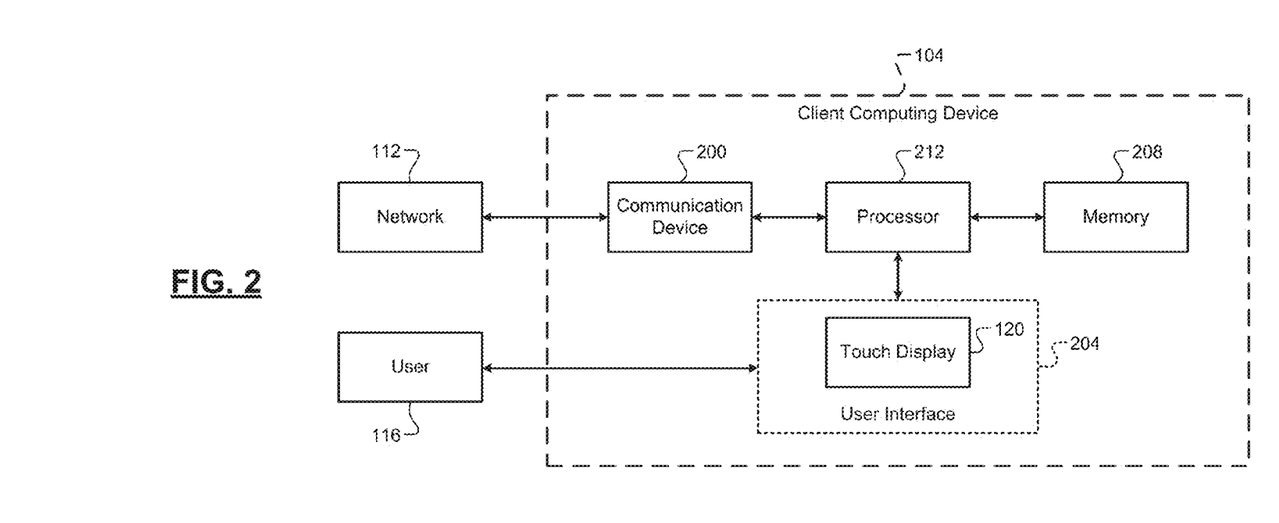
FIG. 2 is a diagram of an example computing device according to some implementations of the present disclosure.

Referring now to FIG. 2, an example configuration for the client computing device 104 is illustrated. The client computing device 104 can include a communication device 200 (e.g., a transceiver) configured for communication via the network 112. The client computing device 104 can include a user interface 204 configured to receive input and/or output information from/to the user 116. One example component of the user interface 204 is the touch display 120. Other example components of the user interface 204 include a physical keyboard, a physical button, and a speaker. The client computing device 104 can include a non-transitory computer-readable medium or computer memory 208 (flash, hard disk, etc.) configured to store information (e.g., language models, character recognition models, and a set of instructions for execution) at the client computing device 104.

The client computing device 104 can also include a processor 212 configured to control operation of the client computing device 104. The term "processor" as used herein can refer to both a single processor and a plurality of processors operating in a parallel or distributed architecture. As mentioned above, the memory 208 may store a set of instructions that, when executed by the processor 212, causes the client computing device 104 to perform at least a portion of the techniques herein. It will be appreciated, however, that the server computing device 108 may perform at least a portion of the techniques of the present disclosure. The server computing device 108, therefore, can have the same or a similar components and/or configuration as the client computing device 104 (a user interface, a transceiver, a processor, a memory, etc.).

Figure 3:
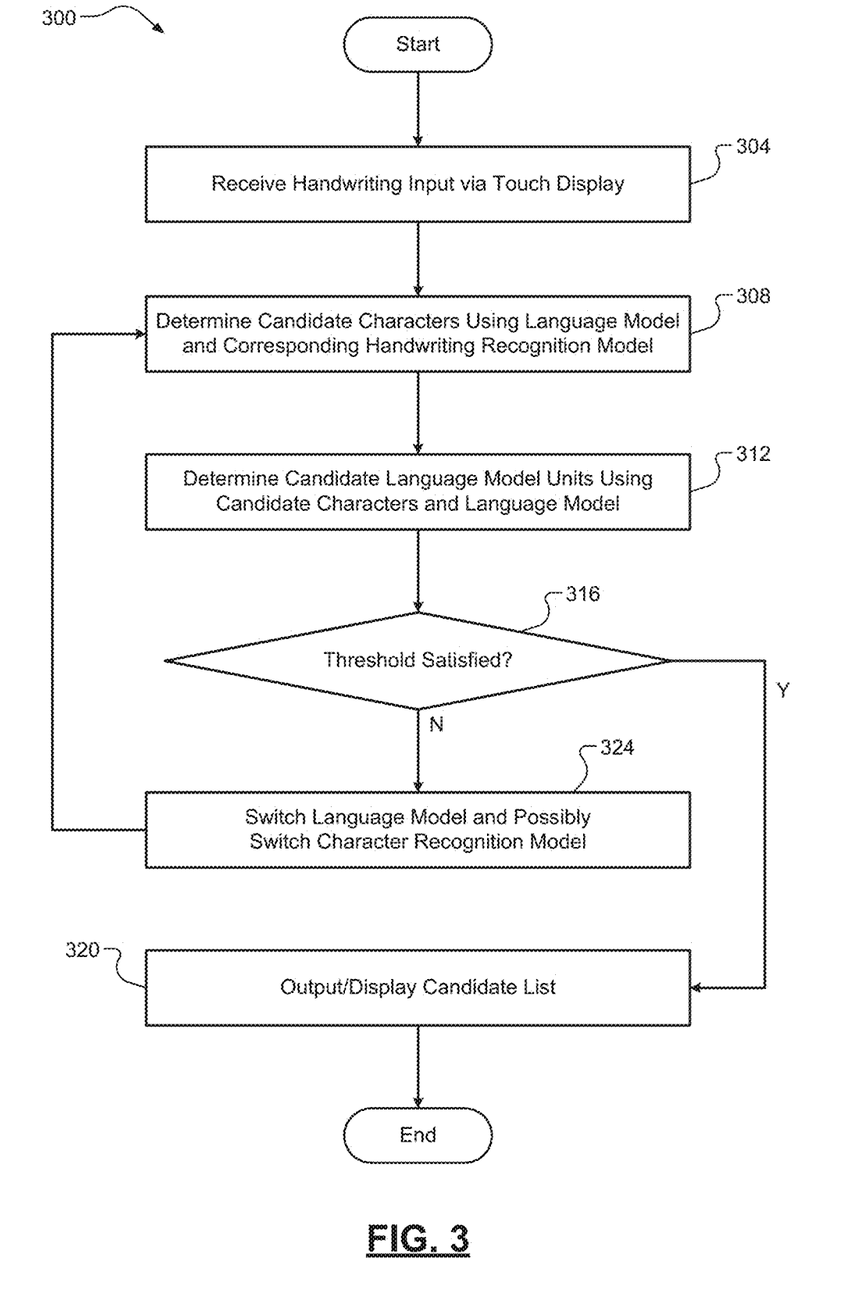
FIG. 3 is a flow diagram of an example method for scheduling language models and character recognition models for handwriting inputs according to some implementations of the present disclosure.
Figure 4:
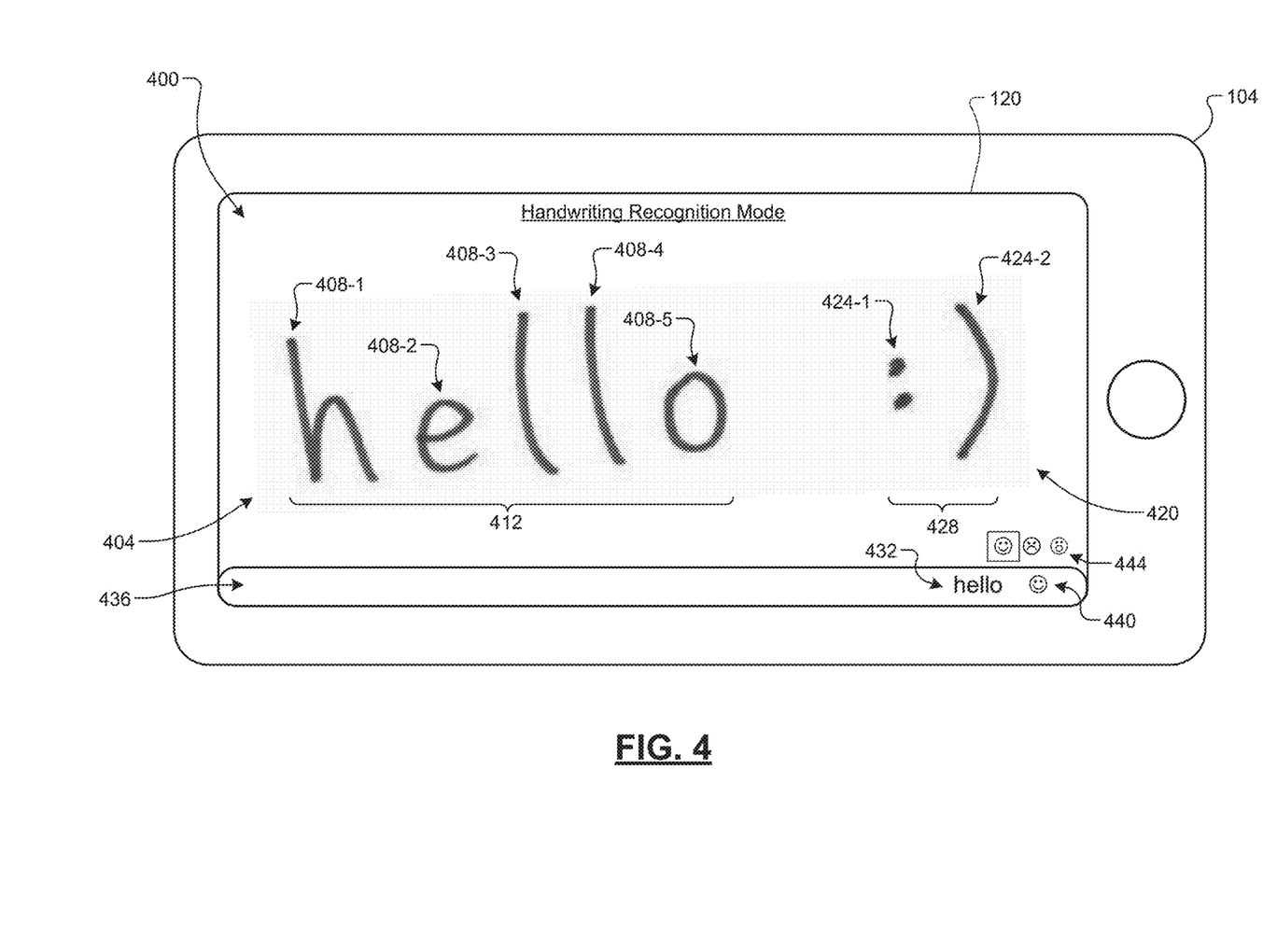
FIG. 4 is an example user interface according to some implementations of the present disclosure.

Referring now to FIGS. 3 and 4, a flow diagram of an example method 300 for scheduling language models and character recognition models for handwriting inputs is illustrated along with an example user interface 400 for a handwriting recognition mode (e.g., representing an application executing at the client computing device 104, such as for the composition of an electronic message like an email or a text message). At 304, the client computing device 104 can receive, via the touch display 120, a first handwriting input comprising one or more first strokes corresponding to a set of first characters. The set of first characters can comprise one or more first characters forming a first language model unit (e.g., a word). In FIG. 4, a first handwriting input 404 comprises strokes for a set of five characters 408-1 ("h"), 408-2 ("e"), 408-3 ("I"), 408-4 ("I"), and 408-5 ("o") (collectively, "characters 408") that form a language model unit 412 (the word "hello").

At 308, the client computing device 104 can determine a set of candidate characters for each first character of the set of first characters based on an analysis of the first handwriting input using a first language model and a corresponding first character recognition model. In FIG. 4, the first handwriting input 404 is analyzed to determine candidates for each of the characters 408. For example, the character "i" may be a less likely candidate than the character "I" for characters 408-3 and 408-4. In the illustrated example, the first language model is for the natural language English, which may also be a default language model. This default language model could be preset for the client computing device 104 or could be selected by the user 116 (e.g., in a preferences menu). By using the English language model, the character recognition model is configured to identify candidate Roman characters of the English alphabet. For example only, these Roman characters could include lowercase "a" through "z," capital "A" through "Z," numerals "0" through "9," and some set of punctuation characters (period, comma, etc.).

At 312, the client computing device 104 can determine a set of candidate first language model units based on an analysis of the one or more sets of candidate first characters using the first language model, with each candidate first language model unit having a corresponding first probability score. In FIG. 4, the candidates for each of the characters 408 are fed into the English language model and candidate language model units (words) are determined. One such candidate can be the word "hello," which may have the highest relative probability score. At 316, the probability scores for the candidates are compared to a threshold indicative of an acceptable likelihood that the candidate is the appropriate language model unit for the handwriting input. When one candidate satisfies the threshold, the client computing device 104 can select that candidate at 320. In FIG. 4, the candidate "hello" satisfies the threshold and is thus selected and output/displayed at 432 within input area 436. This could be performed, for example, either automatically or after a user selection of the candidate "hello" from a displayed candidate list (not shown). Displaying the candidate list, however, could just involve displaying the candidate "hello" (e.g., automatically). The method 300 can then end or return to 304.

This process can repeat for a second handwriting input including one or more second strokes corresponding to a set of second characters. The set of second characters can comprise one or more second characters forming a second language model unit. In FIG. 4, a second handwriting input 420 comprises strokes for a set of second characters 424-1 (":") and 424-2 (")") (collectively "characters 424") that form a language model unit 428 (":)"). This language model unit 428, however, is not a word in the traditional sense; it is an emoji of a smiley face. While referred to herein as an emoji, it will be understood that language model unit 428 may also be described as a shortcut or textual representation of an image. In other words, when provided as input, the language model unit 428 may then be converted into an image for display (e.g., see image 440 depicting a smiley face, which is discussed further below). Another candidate list 444 could be displayed and the smiley face 440 could be selected therefrom as shown. The smiley face 440 can be the most-likely candidate, as it appears in a left-most position of the candidate list 444. Alternatively, as described above, the smiley face 440 could be automatically selected and displayed without further user interaction.

The client computing device 104 can determine candidates for each of the characters 424 and can then feed the candidates into the English language model. The candidates generated using the English language model, however, will all likely have probability scores that do not satisfy the threshold at 316. This is because there is no English word that can be formed using the characters 424. For example, because the Roman alphabet does not include the characters 424, the most likely character sets could be determined as "ii" or "Oii," which do not correspond to any English words. In this case, the method 300 can proceed to 324. At 324, the client computing device 104 can switch to a different second language model and its corresponding character recognition model and the method 300 can return to 308.

At 308 and 312, the client computing device 104 can determine another one or more sets of candidate second characters and another set of candidate second language model units based on an analysis of the second handwriting input 420 using the different second language model and its corresponding second character recognition model. In FIG. 4, the client computing device 104 can switch to using an emoji language model and a corresponding character recognition model. The use of the English language model and its corresponding character recognition model, however, does not overlap temporally with the use of the emoji language model and its corresponding character recognition model. In this manner, only one set of models is running at a given time, which can save computing resources.

At 316, the client computing device 104 can again determine whether one of these new candidates satisfies the threshold. If there are still no candidates that satisfy the threshold, the method 300 can switch to another different language model and its corresponding character recognition model at 324 and the method 300 can again return to 308. If one of the candidates does satisfy the threshold at 316, however, it can be selected by the client computing device at 320 and the method 300 can end or return to 304. Alternatively, a list of candidates can be output/displayed, e.g., after which, a selection can be made by the user 116. In FIG. 4, the candidate ":)" satisfies the threshold and is thus selected. As previously mentioned, in selecting candidates that satisfy the threshold, the client computing device 104 can output the selected candidates (e.g., via the touch display 120), such as the candidate ":)" or its corresponding image ☺ 440 being displayed in the input area 436.

It will be appreciated that the different language models could be associated with the same character recognition model, and that the client computing device 104 could switch back to a previously used language model. More specifically, two different natural languages could share the same alphabet, and thus the same character recognition model could be used for both. Such a situation could involve mixed language input. For example, the user 116 may want to enter "hi! how are you? Should we meet at Hauptbahnhof next to the Brezel-Konig??" Here, the English language model would work well up until the German word Hauptbahnhof. A switch to using a German language model could be made when the client computing device 104 determines that English candidates for the handwriting input corresponding to Hauptbahnhof do not satisfy the threshold.

Another switch back to the English language model could be made after the German word Hauptbahnhof for the words "next to the." And yet another switch could be made back to the German language model for the words "Brezel-Konig??." In FIG. 4, for example, a third handwriting input (e.g., "how are you?") could be received after the second handwriting input 420. This additional handwriting input could be analyzed using the emoji model and its corresponding character recognition model and, when no candidate language model units satisfy the threshold, the client computing device 104 could switch back to the English language model and its corresponding character recognition model, which would likely produce a candidate words that satisfies the threshold. Context can also be utilized for determining the probability scores. For n-gram based language models, for example, previous n-grams (e.g., an (n−1) gram) can represent previously selected or accepted candidates and thus can be indicative of a context of the handwriting input being analyzed. This context can therefore be used by the language models when determining the candidate language model units and their corresponding probability scores. For example, previous words "I love you" may indicate a smiley face or happy emoji as opposed to a sad emoji.

Further to the descriptions above, a user may be provided with controls allowing the user to make an election as to both if and when systems, programs or features described herein may enable collection of user information (e.g., information about a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, via a touch display of a computing device, handwriting input comprising one or more strokes corresponding to one or more characters forming a language-model unit;
determining, by the computing device and based on analysis of the handwriting input using a language model and a character-recognition model corresponding to the language model, a first set of candidate characters for the one or more characters;
determining, by the computing device and based on analysis of the first set of candidate characters using the language model, a set of candidate units of the language model; and
responsive to a determination, by the computing device and for each candidate unit of the set of candidate units of the language model, that a probability score corresponding to the candidate unit fails to satisfy a threshold indicative of an acceptable likelihood that the candidate unit is an appropriate language-model unit for the handwriting input:
selecting, by the computing device, a different language model;
determining, by the computing device and based on analysis of the handwriting input using the different language model and a character-recognition model corresponding to the different language model, a second set of candidate characters for the one or more characters;
determining, by the computing device and based on analysis of the second set of candidate characters using the different language model, a set of candidate units of the different language model; and
responsive to a determination, by the computing device, that a probability score corresponding to a candidate unit of the set of candidate units of the different language model satisfies the threshold indicative of the acceptable likelihood that the candidate unit is an appropriate language-model unit for the handwriting input, outputting, by the computing device and via the touch display, a candidate list for the handwriting input comprising at least one unit of the set of candidate units of the different language model.

2. The computer-implemented method of claim 1, wherein the using the language model does not overlap temporally with the using the different language model.

3. The computer-implemented method of claim 1, wherein the using the language model does not overlap temporally with the using the different language model, thereby enabling the computing device to use less computing resources than if the using the language model and the using the different language model were to occur simultaneously.

4. The computer-implemented method of claim 1, wherein the character-recognition model corresponding to the language model is different than the character-recognition model corresponding to the different language model.

5. The computer-implemented method of claim 1, wherein the character-recognition model corresponding to the language model is the same as the character-recognition model corresponding to the different language model.

6. The computer-implemented method of claim 1, wherein:
the language model corresponds to a natural language; and
the different language model corresponds to a different natural language.

7. The computer-implemented method of claim 1, wherein:
the language model corresponds to a natural language; and
the different language model corresponds to an emoji language.

8. The computer-implemented method of claim 1, comprising determining, by the computing device, the probability score corresponding to the candidate unit of the set of candidate units of the different language model based on a context of the handwriting input.

9. The computer-implemented method of claim 8, wherein the context comprises one or more units of the language model previously determined, by the computing device and using the language model, for one or more strokes previously received via the touch display.

10. The computer-implemented method of claim 1, comprising selecting, by the computing device, the language model based on default settings of the computing device.

11. The computer-implemented method of claim 1, comprising selecting, by the computing device, the language model based on user input.

12. The computer-implemented method of claim 1, comprising outputting a unit from the candidate list within an input area of an interface displayed via the touch display.

13. The computer-implemented method of claim 12, wherein outputting the unit from the candidate list is performed responsive to selection of the unit from the candidate list by a user of the computing device.

14. A system comprising:
one or more processors; and
a memory storing instructions that when executed by the one or more processors cause the system to perform operations comprising:
receiving, via a touch display, handwriting input comprising one or more strokes corresponding to one or more characters forming a language-model unit;
determining, based on analysis of the handwriting input using a language model and a character-recognition model corresponding to the language model, a first set of candidate characters for the one or more characters;
determining, based on analysis of the first set of candidate characters using the language model, a set of candidate units of the language model; and
responsive to a determination, for each candidate unit of the set of candidate units of the language model, that a probability score corresponding to the candidate unit fails to satisfy a threshold indicative of an acceptable likelihood that the candidate unit is an appropriate language-model unit for the handwriting input:
selecting a different language model;
determining, based on analysis of the handwriting input using the different language model and a character-recognition model corresponding to the different language model, a second set of candidate characters for the one or more characters;
determining, based on analysis of the second set of candidate characters using the different language model, a set of candidate units of the different language model; and
responsive to a determination that a probability score corresponding to a candidate unit of the set of candidate units of the different language model satisfies the threshold indicative of the acceptable likelihood that the candidate unit is an appropriate language-model unit for the handwriting input, outputting, via the touch display, a candidate list for the handwriting input comprising at least one unit of the set of candidate units of the different language model.

15. The system of claim 14, wherein the using the language model does not overlap temporally with the using the different language model, thereby enabling the system to use less computing resources than if the using the language model and the using the different language model were to occur simultaneously.

16. The system of claim 14, wherein:
the character-recognition model corresponding to the language model is different than the character-recognition model corresponding to the different language model;
the language model corresponds to a natural language; and
the different language model corresponds to an emoji language.

17. The system of claim 14, wherein the operations comprise determining the probability score corresponding to the candidate unit of the set of candidate units of the different language model based on a context of the handwriting input comprising one or more units of the language model previously determined, by the system and using the language model, for one or more strokes previously received via the touch display.

18. One or more non-transitory computer-readable media comprising instructions that when executed by one or more computers cause the one or more computers to perform operations comprising:
receiving, via a touch display, handwriting input comprising one or more strokes corresponding to one or more characters forming a language-model unit;
determining, based on analysis of the handwriting input using a language model and a character-recognition model corresponding to the language model, a first set of candidate characters for the one or more characters;
determining, based on analysis of the first set of candidate characters using the language model, a set of candidate units of the language model; and
responsive to a determination, for each candidate unit of the set of candidate units of the language model, that a probability score corresponding to the candidate unit fails to satisfy a threshold indicative of an acceptable likelihood that the candidate unit is an appropriate language-model unit for the handwriting input:
selecting a different language model;
determining, based on analysis of the handwriting input using the different language model and a character-recognition model corresponding to the different language model, a second set of candidate characters for the one or more characters;
determining, based on analysis of the second set of candidate characters using the different language model, a set of candidate units of the different language model; and responsive to a determination that a probability score corresponding to a candidate unit of the set of candidate units of the different language model satisfies the threshold indicative of the acceptable likelihood that the candidate unit is an appropriate language-model unit for the handwriting input, outputting, via the touch display, a candidate list for the handwriting input comprising at least one unit of the set of candidate units of the different language model.

19. The one or more non-transitory computer-readable media of claim 18, wherein the using the language model does not overlap temporally with the using the different language model, thereby enabling the computing device to use less computing resources than if the using the language model and the using the different language model were to occur simultaneously.

20. The one or more non-transitory computer-readable media of claim 18, wherein the operations comprise determining the probability score corresponding to the candidate unit of the set of candidate units of the different language model based on a context of the handwriting input comprising one or more units of the language model previously determined, by the one or more computers and using the language model, for one or more strokes previously received via the touch display.

* * * * *